Oct. 9, 1951 C. W. EARP ET AL 2,570,220

PULSE CODE MODULATION SYSTEM

Filed Feb. 10, 1949 5 Sheets-Sheet 1

Inventors
CHARLES WILLIAM EARP
MALCOLM FRANK WINTLE
By [signature]
Attorney

Inventors
CHARLES WILLIAM EARP
MALCOLM FRANK WINTLE
By [signature]
Attorney

PULSE CODE MODULATION SYSTEM

Filed Feb. 10, 1949 5 Sheets-Sheet 3

Inventors
CHARLES WILLIAM EARP
MALCOLM FRANK WINTLE
By R. F. Morris
Attorney

Inventors
CHARLES WILLIAM EARP
MALCOLM FRANK WINTLE
By R P Morris
Attorney

Oct. 9, 1951 C. W. EARP ET AL 2,570,220

PULSE CODE MODULATION SYSTEM

Filed Feb. 10, 1949 5 Sheets-Sheet 5

Inventors
CHARLES WILLIAM EARP
MALCOLM FRANK WINTLE
By [signature]
Attorney

Patented Oct. 9, 1951 2,570,220

UNITED STATES PATENT OFFICE 2,570,220

PULSE CODE MODULATION SYSTEM

Charles William Earp and Malcolm Frank Wintle, London, England, assignors to International Standard Electric Corporation, New York, N. Y., a corporation of Delaware Application February 10, 1949, Serial No. 75,532
In Great Britain February 20, 1948

13 Claims. (Cl. 332—9)

The present invention relates to electric pulse code modulation systems of communication.

These systems are of the kind described in Reeves, U. S. Patent Specification No. 2,272,070.

The present invention concerns a pulse code modulation system in which a binary code is used for expressing the signal amplitudes. In this system the signal amplitude is scanned at the sending end at a sufficient number of instants, and the amplitude at each instant is determined according to a scale having a finite number of steps, and the nearest scale value is expressed by a code in which at each of a specified number of instants in each code group a pulse may be present or absent. If there are $m$ such instants, then the number of scale values which can be expressed is $2m$.

Now it is evident that the amplitude scale can be expressed by this binary code in a number of different ways, and the particular scheme of coding which has been already proposed has been determined mainly by conditions of simplicity.

This code, called the "simple addition code," which will be explained later, has certain serious disadvantages connected with the effects of accidental coding errors, and accordingly in the specification of copending U. S. application No. 3230 by P. R. Aigrain, filed January 20, 1948, a particular form of the binary code has been proposed, called a "cyclic permutation code," which has the property that a change in the signal amplitude of one step of the scale can never produce a change in more than one element of the code. This code has also been called the "staggered step code," and will be so referred to in the present specification.

According to the arrangements described in the above-mentioned Aigrain specification, after the cyclic permutation or staggered step code has been set up, it is converted into the usual simple addition code before transmission over the communication medium, so that the decoding arrangements at the receiving end may be conventional. However, it is to be noted that the simple addition code is rather easy to decode, so that the arrangement does not provide any appreciable degree of secrecy, if this should be desired.

The principal object of the invention, therefore, is to exploit further the advantages of the staggered step code for improving the secrecy of a communication system.

Another object is to improve the arrangements for coding a signal wave according to the staggered step code.

A further object is to provide means at the receiving end of a communication system for decoding the staggered step pulse code groups.

According to one feature of the invention, the code groups of pulses are produced at the transmitting end of the system according to the staggered step code and are then directly transmitted to the receiver instead of first converting them to code groups according to the simple addition code.

According to another feature, the code groups of pulses are produced by first frequency modulating a carrier wave in accordance with the signal wave. This wave is then passed through phase changers from which are obtained a plurality of derived waves each of which is in quadrature with the original frequency modulated wave at $2r$ frequencies, where $r$ is zero or a positive integer, and is different for each derived wave. A code pulse corresponding to each derived wave is then generated only when the derived wave has a frequency which lies in alternate bands between adjacent pairs of the $2r$ frequencies.

According to a further feature of the invention, the code groups of pulses representing the signal according to the staggered step code are demodulated at the receiving end by directing the pulses corresponding respectively to the code elements of each group into separate channels to operate a series of corresponding two-condition multivibrators or trigger circuits normally in the unoperated condition, each of which is arranged to produce when operated an output voltage proportional to $2m$, where $m$ has a different integral value (or zero) for each trigger circuit. The pulses (if present) in the respective code elements are applied in turn to reverse the condition of some or all of the trigger circuits, the output voltages of which are combined. The arrangement is such that a pulse in any code element reverses the trigger circuit corresponding to that code element, and also those corresponding to all the succeeding elements. The combined output voltages are gated to produce amplitude modulated pulses from which the signal wave is recovered in the usual way.

The invention will be described in more detail with reference to the accompanying drawings in which:—

Figure 1:
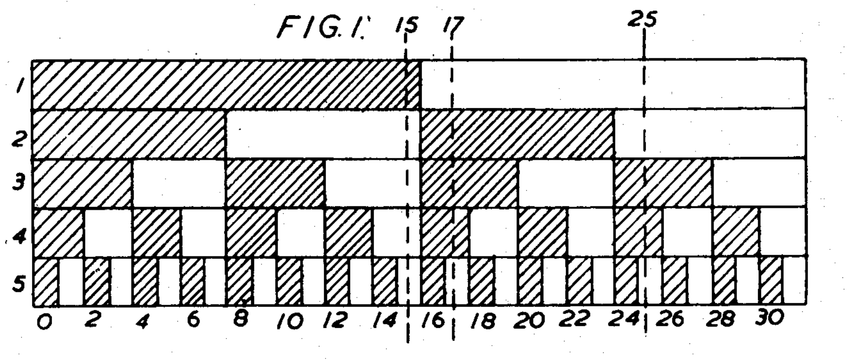
Fig. 1 shows a diagram of the ordinary simple addition type of binary code which has been employed hitherto.

Fig. 1 shows diagrammatically the form of binary code which has previously been employed. It is a five-element code intended for expressing an amplitude scale having 32 steps numbered from zero to 31 inclusive. The amplitudes do not necessarily increase by equal amounts, and in fact, it is often desirable that the amplitudes should increase logarithmically. In Fig. 1 the step numbers are set out in order horizontally, and the code elements are set out vertically, numbered from 1 to 5. A code element means a period during which a code pulse may be present or absent. In Fig. 1 the shaded areas represent code elements during which a pulse is absent, and the unshaded areas represent code elements during which a pulse is present.

By this code, the step number N of the amplitude scale is given by the simple addition formula $N=\Sigma a_r 2^r$, where $r$ has all values from zero to 4, and $a_r$ is 1 or zero, according as a code pulse is present or absent during the $r$th code element. This code will accordingly be called for convenience a "simple addition binary code."

Since the amplitude number is expressed by such a simple formula, it is easy to reconstitute the signal amplitude from the code group by a single addition process.

It should be further noted that when the step number N changes by one unit from 15 to 16 a change occurs in every one of the five code elements: when it changes from 7 to 8 or from 23 to 24 changes occur in four of the code elements: in four cases changes occur in three of the code elements, and so on. That so many simultaneous changes in the code elements may occur for one amplitude step is a serious objection, and makes the system particularly susceptible to coding errors which may result from small variations in the performance of the equipment.

It has been found that the avoidance of these coding errors results in extremely complicated arrangements, particularly when coding is carried out by means of a cathode ray tube device, such as that described in "Tele Tech," November 1947, page 31.

As will become clear later, the case of the staggered step code according to the present invention results in simple coding arrangements, since it is not susceptible to certain coding errors due to the apparatus.

Figure 2:
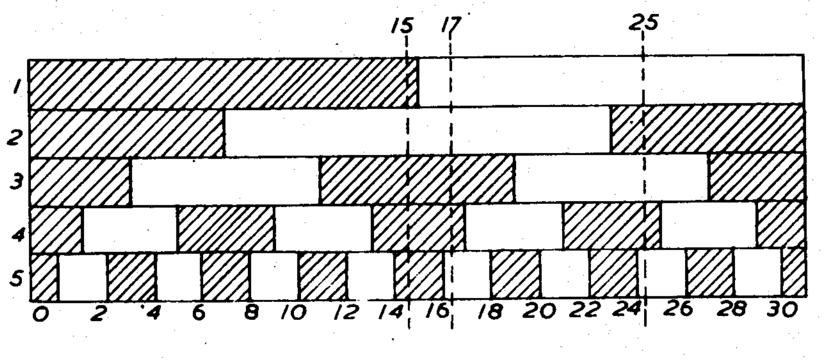
Fig. 2 shows a diagram of the staggered step binary code according to the invention.

Fig. 2 shows a diagram of the staggered step code characteristic of the present invention. The arrangements are such that for the first code element a single change occurs between amplitudes 15 and 16; for the second code element two changes occur at points midway between the point corresponding to the previous change and the ends of the scale. For the third code element, four changes occur at points midway between the preceding points and the ends of the scale, and so on. This is the reason for the term "staggered step binary code," and the result is that as the signal amplitude increases, changes occur in only one code element at a time.

If the diagram of Fig. 2 be inspected, it will be found that in every case, when the amplitude changes by one step, a change occurs in only one code element. It will be noted also that the only amplitude steps which have the same code in Figs. 1 and 2 are the steps zero and 1, but for the other steps the correspondence between the two codes is not very simple as is described hereinafter. It will be clear that special means will be required to decode the staggered step code, since a simple addition process will not serve.

The following correspondence between Figs. 1 and 2 may however be pointed out. Whenever a change accurs in code element $n$ in Fig. 2 it will be found that in Fig. 1 there is a simultaneous change of code element $n$ and all elements of higher number.

Figure 3:
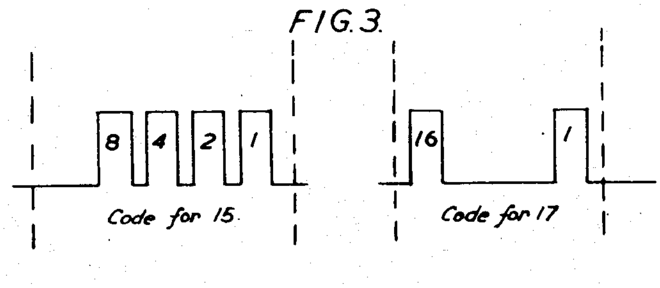
Fig. 3 shows two examples of code groups of pulses according to the known binary code.
Figure 4:
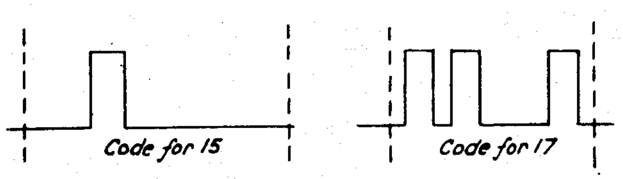
Fig. 4 shows the corresponding code groups according to the staggered step code.

As an example of the difference between the two codes, Figs. 3 and 4 show the code groups corresponding to 15 and 17 for the ordinary code and for the staggered step code, respectively. In Fig. 3, each pulse is marked with the amplitude number which it represents. It is evident that if an attempt were made to receive the staggered step code with apparatus intended for the ordinary binary code, an amplitude of 15 transmitted by the staggered step code would be received as 8 while one of 17 would be received as 25, and the result would be unintelligible.

Figure 5:
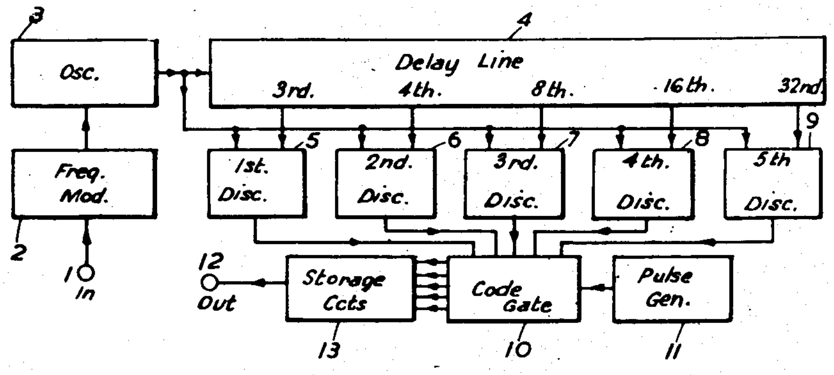
Fig. 5 shows a block schematic circuit diagram of a pulse code modulator adapted to produce code groups according to the staggered step binary code.

An arrangement for coding the signal amplitude according to a five-unit staggered step binary code is shown in Fig. 5 in block schematic form.

The speech wave to be coded is applied at terminal 1 to a frequency modulator 2 which controls the frequency of an oscillator 3 which generates sine waves at a suitably high frequency F, the maximum frequency variation being within the limits $F \pm f$.

The waves are supplied to a delay line 4 which is composed of a number of band-pass filter sections, the center frequency of the pass band being F, and the band width $2f$.

Five discriminators 5, 6, 7, 8 and 9 corresponding to the five code elements are supplied from tapping points in the delay line 4, and each is also supplied with the waves directly from the oscillator 3. These discriminators supply gating pulses to a code gate circuit 10 to which is connected a pulse generator 11. The gate circuit is so controlled by the gating pulses from the discriminators that the pulses from the generator are passed through in the desired code groups. These code groups may be transmitted directly to the output circuit connected to terminal 12, or may be held in some suitable storage circuits 13 for transmitting at the desired times.

The manner in which this circuit operates will be explained after the details of some of the elements of Fig. 5 have been described with reference to Fig. 6. In this figure the oscillator 3 supplies the frequency modulated waves through a conventional amplifying valve 14 to the delay line 4 which should be terminated at the distant end by a resistance 15 equal to its characteristic impedance, in order to avoid reflections. The valve is supplied from a high tension source (not shown) connected to terminals 16 and 17. The cathode of this valve is grounded through a conventional bias network 18, the screen grid is polarized through resistance 19 with by-pass condenser 20, and 21 is the usual anode load resistance.

The delay line 4 comprises 32 band-pass filter sections shown as consisting of a number of series condensers and shunt resonant circuits, but it could take other forms. At the center frequency F the voltage across the odd numbered shunt circuits is in quadrature with the voltage applied to the input terminals, but the voltage across the even numbered shunt circuits is in the same phase as the input voltage, or in the opposite phase. Furthermore, as the frequency changes from $F-f$ to $F+f$, the phase change per section of the filter varies by a total of 90 degrees. The significance of these facts will be pointed out later.

Figure 6:
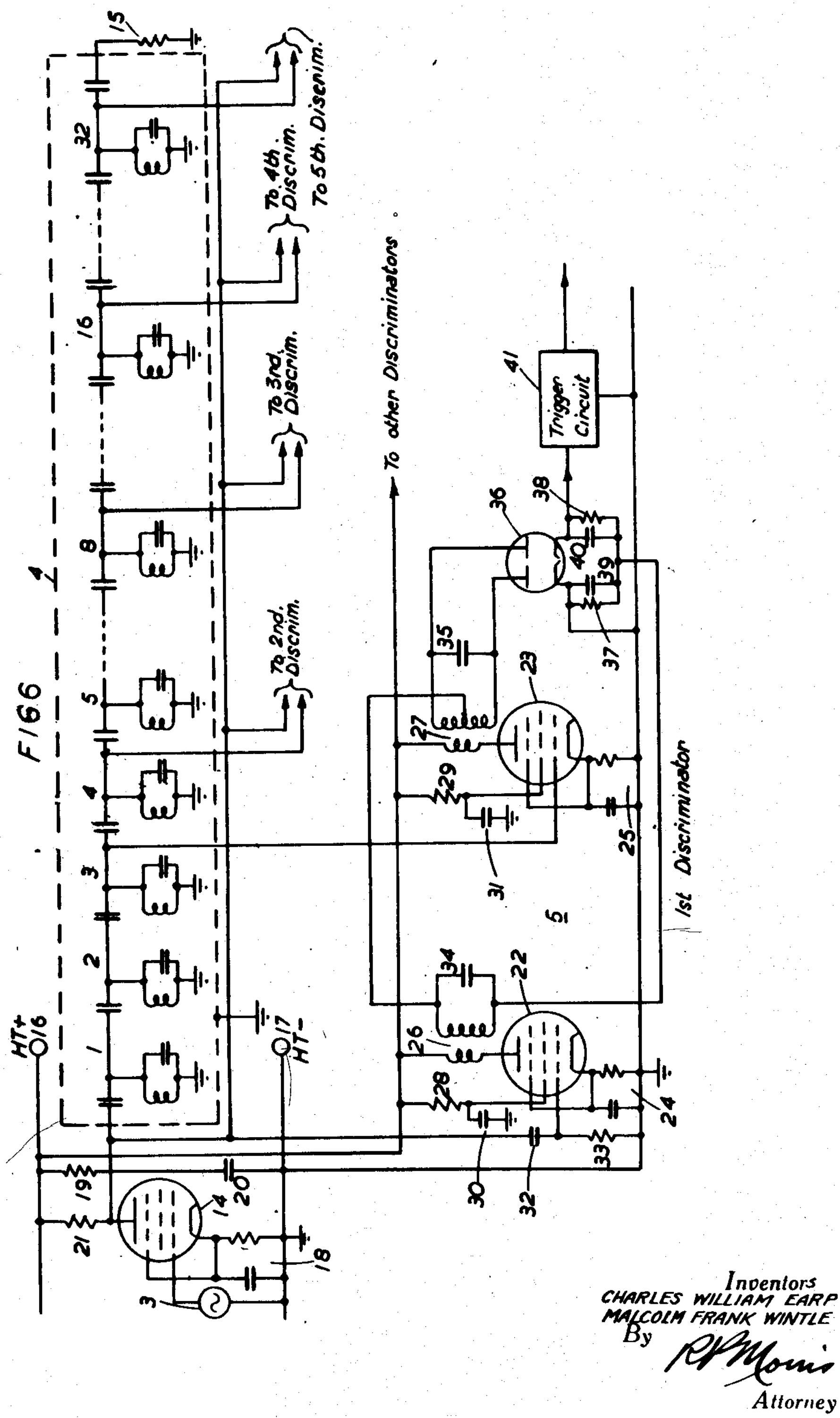
Fig. 6 shows circuit details of Fig. 5.

Details of the first code element discriminator 5 are shown in Fig. 6. The others will all be similar.

The discriminator 5 comprises two valves 22 and 23 with cathode bias networks 24 and 25, and with their anodes connected to terminal 16 through the primary windings of transformers 26 and 27. The screen grids are polarized through resistances 28 and 29 with by-pass condensers 30 and 31.

The control grid of the valve 22 is connected through a blocking condenser 32 to the anode of the valve 14, and to ground through a high resistance 33. The control grid of the valve 23 is connected to the third shunt circuit of the delay network 4.

The secondary windings of the transformers 26 and 27 should be tuned to the frequency F by means of the condensers 34 and 35, and one terminal of the secondary winding of the transformer 26 is connected to the center tap on the secondary winding of the transformer 27.

The terminals of the secondary winding of the transformer 27 are connected respectively to the anodes of the double diode 36, the cathodes of which are connected to the remaining terminal of the secondary winding of the transformer 26 through load resistances 37 and 38 shunted by condensers 39 and 40. The cathode of one of the diode sections is connected directly to ground. The other cathode is connected to a trigger circuit 41 the output of which is connected to the cathode gate circuit 10 of Fig. 5.

Figure 7:
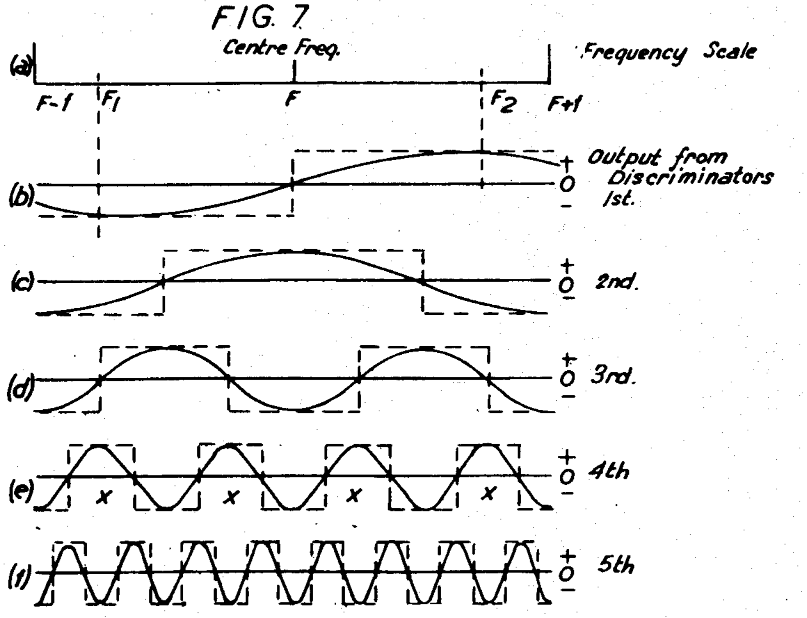
Fig. 7 shows curves used in explaining the action of the modulator illustrated in Figs. 5 and 6.

The action of the discriminator will be understood from the curves of Fig. 7. At (a) is shown a frequency scale applying to all the other curves. The center of this scale is the center frequency F, and the ends are the extreme frequencies $F-f$ and $F+f$.

In curve (b), the full line shows approximately the variation of the potential of the cathode of the diode 36 connected to the trigger circuit 41 in Fig. 6. It has already been explained that the voltage at section 3 of the delay line is in quadrature with the input voltage at the frequency F, so the output voltage of the diodes is zero at this frequency, as indicated. The total phase shift varies by 270 degrees over the range $F-f$ to $F+f$ (since the tap is taken at the third section), and therefore the phase difference will be zero or 180° with respect to the input voltages at frequencies F1 and F2 as indicated. At these frequencies which will be spaced about $2f/3$ from F, the diodes will produce maximum negative and positive output voltages as indicated by the full line curve (b).

However, the important point is the zero point at frequency F. The trigger circuit 41 should be some suitable form of two-condition device such as a double stability multivibrator formed from two cross-connected valves adjusted so as to switch over to the second condition when the applied voltage changes sign from negative to positive, and so that it switches back again when the applied voltage changes back to negative. There should be the minimum possible margin between the two switching values of the applied voltage. The trigger circuit should preferably present a high impedance to the diodes. Then the potential of one of the valve electrodes will vary as indicated by the dotted line in curve (b), and will be applied as a gating potential to control the code gating circuit 10. It will be clear, therefore, that as the signal amplitude increases from zero, the frequency delivered by the amplifier 14 (Fig. 6) increases from $F-f$, and when it reaches the center frequency F, the trigger circuit operates and delivers an unblocking voltage to the code gate circuit. Thus for all signal amplitudes less than that corresponding to F the gate is shut, while for all greater amplitudes it is open.

The remaining discriminators are connected respectively to the 4th, 8th, 16th and 32nd sections of the delay line. The resulting diode output voltages are shown respectively by curves (c), (d), (e) and (f) of Fig. 7. The curve (e) for the fourth discriminator 8 will be explained, and it is believed that the others will not need detailed explanation. Since there are sixteen sections of the delay line the total phase change at frequency F will be 1440 degrees, so that the input and output voltages are in phase. By suitably poling the connection of the diodes 36, a negative maximum rectified voltage may be arranged.

There will also be a total variation of phase change of 1440 degrees over the band from $F-f$ to $F+f$. There will therefore be eight equally spaced intermediate frequencies at which the output voltage is in quadrature with the input voltage. These frequencies are $F+nf/8$ where $n$ is 1, 3, 5 and 7; and at such frequencies the output voltage from the diodes is zero, and the trigger circuit 41 is operated. Thus when the signal amplitude has a value corresponding to any of the frequency ranges marked $x$ on curve (e), the trigger circuit 41 will unblock the code gate circuit 10 and will allow a code pulse to be produced. When the signal amplitude corresponds to the other frequency ranges, no code pulse is produced.

The curves (d) and (f) are similar to (e), except that there are respectively four, and sixteen, intermediate frequencies at which the output voltage from the delay line 4 is in quadrature with the input voltage. Curve (c) is also similar except that there are only two such intermediate points, and further the output voltage is shown positive instead of negative at the center frequency. Thus in the case of the second discriminator, the diodes 36 will be oppositely poled to the diodes for the third, fourth, and fifth discriminators.

It should be remarked also, that the poling of the diodes of the first discriminator should be such that a positive output voltage is produced at the frequency $F+2f/3$.

If the curves of Fig. 7 be compared with Fig. 2, it will be seen that the blocking periods correspond exactly with the shaded areas, so that the desired staggered step code is produced.

Figure 8:
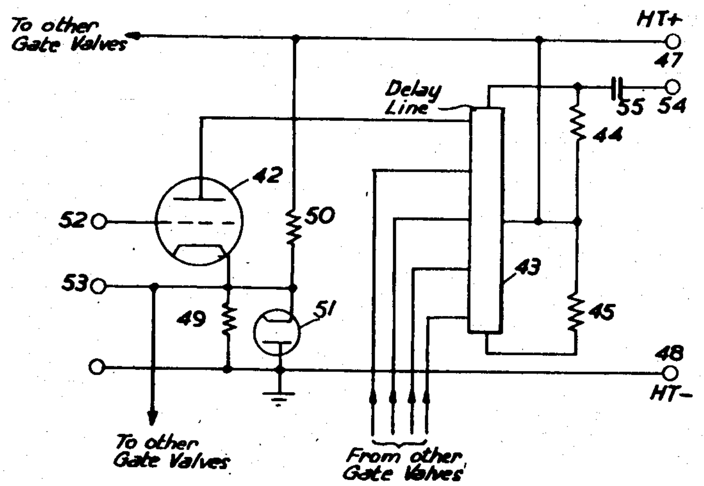
Fig. 8 shows further details of Fig. 5.

Fig. 8 shows details of a suitable code gate circuit 10 and storage circuit 13 for Fig. 5. The gate circuit comprises five similar gate valves, only one of which is shown at 42. The anode of this valve is connected to a corresponding tapping point in delay line 43 taking the form of a low-pass filter, for example, terminated in its characteristic impedance by resistances 44 and 45. The common conductor of the delay line is connected to the high tension positive terminal 47, the corresponding grounded negative terminal being 48.

The cathode of the valve is connected to the junction point of two resistances 49 and 50 connected in series between terminals 47 and 48 to provide a cut-off bias for this valve. The resistance 49 is shunted by a diode 51 with its anode connected to ground.

The output of the trigger device 41 of the discriminator corresponding to the valve 42 is connected to terminal 52 and thence to the cathode of the valve. The trigger device should be arranged to provide an approximately zero voltage when the frequency corresponds to the portions such as $x$ curve $e$ and a large negative voltage sufficient completely to block the valve 42 when the frequency has other values. The pulses from the generator 11 (Fig. 5) are applied in negative sense to terminal 53 and thence to the cathode. Each pulse should be of sufficient amplitude to neutralise the cut-off bias produced by the resistances 49 and 50 and so to produce an output pulse if the trigger circuit has unblocked the valve by the voltage applied to its grid. The diode 51 prevents the cathode from acquiring a negative potential and so prevents the control grid from drawing any appreciable current and so becoming a load on the trigger device. The output pulses are obtained from terminal 54 connected to one end of the delay line through a blocking condenser 55.

The four other gate valves (not shown) are arranged similarly to the valve 42. The anodes of these valves are connected to four other tapping points on the delay line 45, so chosen that the code pulses passed by the five valves are assembled in any desired manner. The cathodes of all the gate valves will be connected in common to terminal 53, and the control grid of each will be connected to the trigger circuit 41 of the corresponding discriminator.

The time taken in coding the signal amplitude is little more than the delay introduced by the 32 sections of the delay line 4, which may, for example, be about 5 microseconds. If the signal amplitude is scanned, for example, 8,000 times per second, then there would be time to fit code groups for about 20 signal channels in each scanning interval.

It may be found difficult or expensive to design a satisfactory delay line having as many as 32 sections, and a line with 16 sections may be used if frequency doubling is adopted for the last discriminator 9 of Fig. 5.

Figure 9:
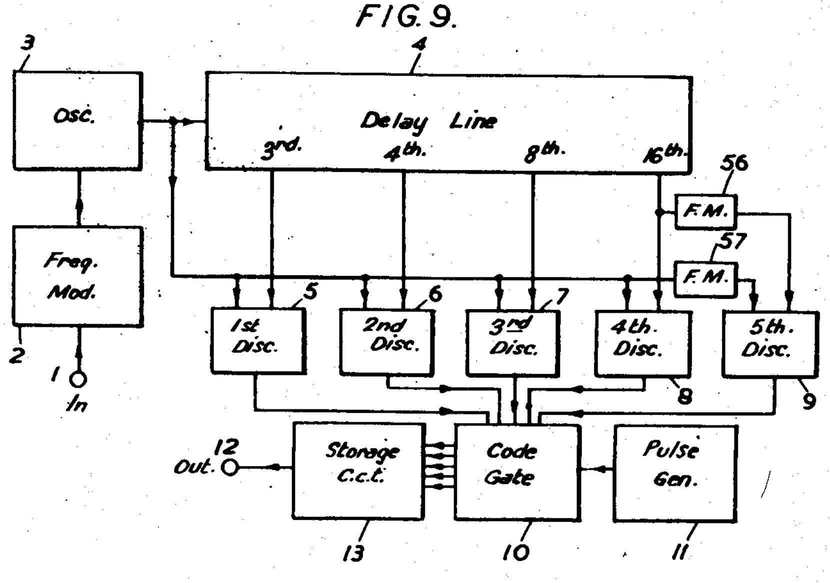
Fig. 9 shows a block schematic circuit diagram of a modification of the modulator according to Fig. 5.

This modified arrangement is shown in Fig. 9. The 16th section of the delay line 4 supplies the discriminator 9 through a frequency doubler 56, while the oscillator 3 supplies this discriminator 9 through a second frequency doubler 57. These frequency doublers may for example, be non-linear amplifiers adapted to produce harmonics, with suitable band-pass filters for selecting the second harmonic. It will be clear that since the frequency is doubled, the cycles of phase change in the doubled frequency waves will occur twice as fast so that while curve $e$ Fig. 7, represents the conditions for the discriminator 8, curve $f$ in which there are twice as many cycles of variation will represent the conditions for the discriminator 9.

It is clear that this principle could be extended so that, for example, the tapping No. 4 on the delay line could supply the discriminator 7 through one doubling stage, the discriminator 8 through two doubling stages, and the discriminator 9 through three doubling stages, with corresponding doubling stages in the conduction from the oscillator 3. The increase in the frequency applied to the last doubler which this process would entail, might, however be inconvenient.

It should be explained that the code element pulses do not need to be transmitted in the order 1, 2, 3, 4, 5 indicated in Fig. 2. They may be transmitted in any order, provided that corresponding arrangements are provided at the receiver for identifying them.

Figure 10:
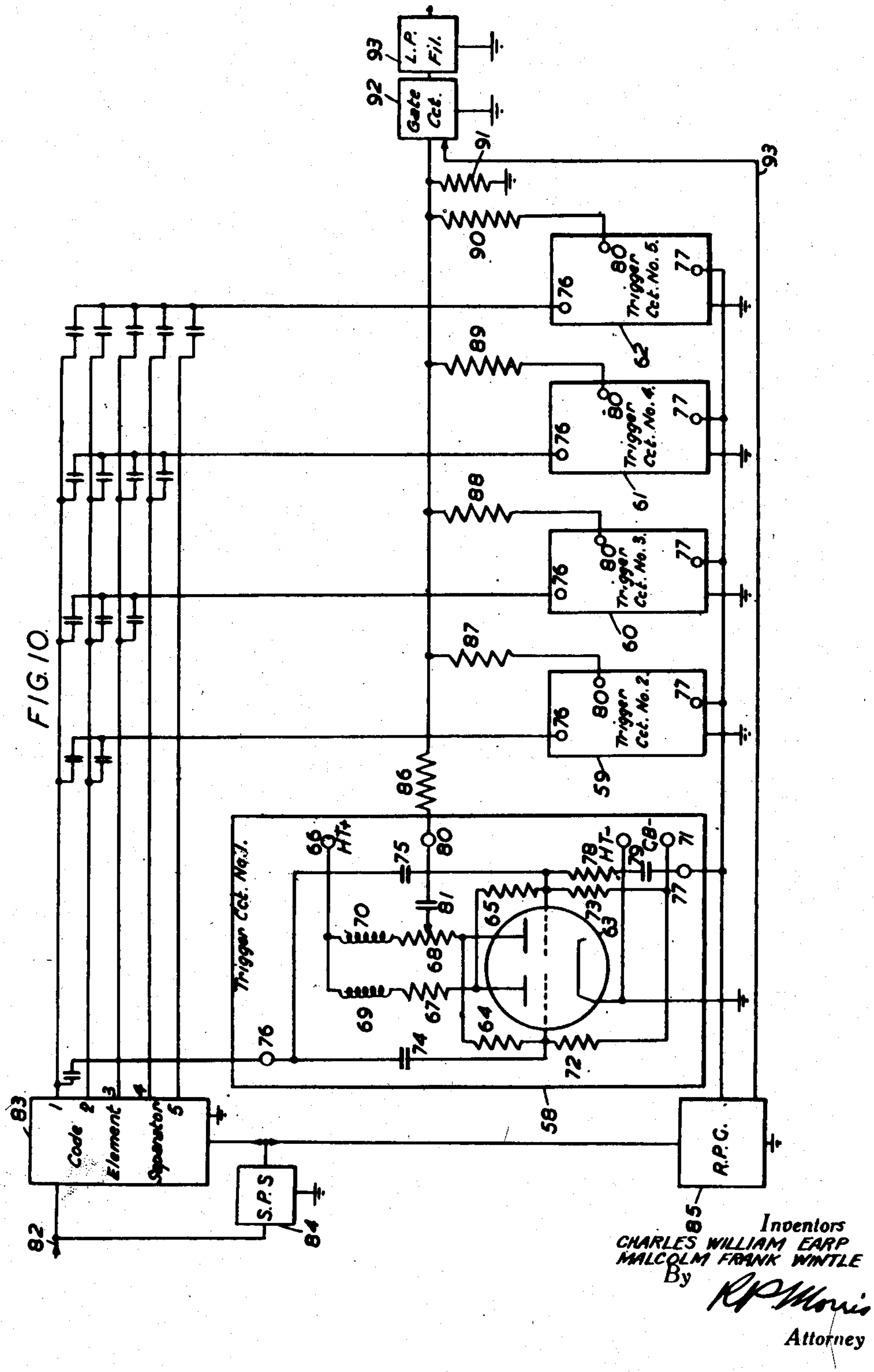
Fig. 10 shows a demodulator for pulse groups coded according to the staggered step binary code.

Fig. 10 shows an arrangement for decoding the pulse code groups of the staggered step binary code. The principal elements comprise five similar two-condition devices or multivibrators of conventional type, 58, 59, 60, 61 and 62 corresponding respectively to code elements Nos. 1 to 5. Circuit details of No. 58 only are given, the others being the same. It comprises a double triode valve 63 with the common cathode connected to ground. The anodes are cross connected to the opposite control grids by resistances 64 and 65, and are connected to the positive high tension terminal 66 through load resistances 67 and 68, and through high frequency choke coils 69 and 70. The control grids are connected to a negative bias terminal 71 through resistances 72 and 73. The control grids are also connected through blocking condensers 74 and 75 to a triggering terminal 76 and the right hand control grid is also connected to a restoring terminal 77 through a resistance 78 and blocking condenser 79. An output terminal 80 is connected through a blocking condenser 81 to an adjustable contact on the resistance 68.

The arrangement will be recognized as a well known two-condition device or multivibrator which is stable in both conditions. It will be assumed that when not operated the left hand half of the triode 63 is cut off. It will be clear that if a positive pulse of sufficient amplitude is applied to terminal 76, the device will be switched over to the other or operated condition in which the right hand half of the valve 63 is cut off, and that if another positive pulse is applied, it will be switched back again to the non-operated condition, and so on.

Furthermore, a positive pulse applied to terminal 77 will restore the circuit to the non-operated condition if it is in the operated condition.

It will be assumed that the pulse code groups corresponding to a plurality of signal channels will be received accompanied as usual by a train of synchronising pulses which are used for separating the groups corresponding to the various channels. The code groups and synchronising pulses are received from the radio receiver, or other communication medium, over conductor 82. This conductor is connected to a conventional gating device 83 and to a synchronising pulse selector 84. The gating device 83 is supplied with control pulses from the selector 84, and is adapted to pick out the pulses corresponding to the code elements of the channel which it is desired to receive. Such code pulses as are present are delivered separately to five output conductors corresponding respectively to the five code elements. The device 83 thus acts as a code element separator and operates on conventional lines, so that it is unnecessary to describe it in greater detail.

The pulses corresponding to code element No. 1 are applied to terminals 76 of each one of the trigger circuits 58 to 62. The pulses corresponding to code element No. 2 are applied to terminal 76 of each of the four trigger circuits 59 to 62: those corresponding to element No. 3 to circuits 60, 61 and 62. Those corresponding to element No. 4 to Nos. 61 and 62: and those corresponding to element No. 5 to No. 62 only. Blocking condensers are preferably included in all such connections, as indicated.

It will be clear that if a pulse corresponding to any code element is present, it will reverse the condition of the corresponding trigger circuit and also of all the following ones, whether these circuits were originally in the operated condition or not. The significance of this will be made clear later.

The synchronising pulses obtained from the selector 84 are also applied to synchronise a restoring pulse generator 85 which supplies positive restoring pulses to the terminal 77 of each of the trigger circuits. This generator should be timed so that a restoring pulse is produced shortly after the corresponding code group is completed setting all the trigger circuits, and restoring them all to the non-operated condition.

The output terminals 80 of the five trigger circuits are connected to a mixing network comprising relatively high equal series resistances 86, 87, 89 and 90 connected in common to a relatively small shunt resistance 91, the potential across which will be substantially equal to the sum of the output potentials of the five trigger circuits. Any other suitable mixing device, possibly including valves, may be used instead.

The potential across the resistance 91 is applied to a conventional gate circuit 92 which is normally blocked, but which is opened for a brief period just after the triggering circuits have been set by the code group, but before restoration by the restoring pulse from the generator 85. The gate circuit may be opened by a suitably timed pulse obtained from this generator over conductor 93. It will be evident that a train of amplitude modulated pulses will be obtained from the gate circuit 92, and the signal may be recovered from these pulses by means of a low pass filter 93 and may be applied to any type of utilisation device (not shown).

It has already been explained that the circuits of the five trigger devices are all similar. However they will differ in the adjustment of the tap on the resistance 68. This adjustment should be in each case such that the change in the potential obtained at the output terminal 80 when the device changes over to the operated condition is proportional to the numbers 16, 8, 4, 2 and 1 respectively, for the trigger devices 58, 59, 60, 61 and 62. The voltage across the mixing resistance 91 will then be proportional to the sum of the voltages corresponding to those trigger devices which are left operated by the pulses of the code group.

The decoding process of Fig. 10 actually leaves the trigger circuits set according to the simple addition binary code illustrated in Fig. 1. This results from the correspondence already pointed out between Figs. 1 and 2: a change of a given code element in Fig. 2 corresponds to a simultaneous change of the same code element and all succeeding elements in Fig. 1. That the desired result is obtained can however best be seen from a particular case. In Fig. 2 the amplitude step 25 is represented by pulses in code elements 1, 3 and 5. If this code group is applied in Fig. 10, the effects are as follows:

Pulse 1 switches over trigger circuits 1, 2, 3, 4 and 5.

Pulse 3 switches back trigger circuits 3, 4 and 5.

Pulse 5 switches over trigger circuit 5.

The resulting distribution is that circuits 1, 2 and 5 are left operated, and 3 and 4 are left unoperated. The output voltage obtained in the mixer 91 is accordingly given by $16+8+1=25$, which corresponds to step 25. The distribution 1, 2, 5 can be seen from Fig. 1 to be the simple edition binary code for 25.

Although it has been assumed that the pulses corresponding to the various code elements are applied to set the trigger circuits in a particular time sequence, this is immaterial. Provided that all such pulses are applied at different times, they could be applied in any order as regards time, and the resulting array of output voltages of the trigger circuits would be the same. If the code element pulses have been transmitted in some order different from that indicated in Fig. 2, it will be necessary either to re-arrange them in the code element separator 83 so that they emerge in the proper order, or to change the distribution of the output voltages of the trigger circuits according to the order in which the code element pulses appear on the output conductors connected to the separator 83.

Although for clearness it has been assumed that a five-unit code is employed, the invention covers a staggered step code having any number of units. It will be obvious that in Fig. 2 one or more of the lower rows may be omitted, or further rows may be added according to the same plan. In Figs. 5 and 9 the number of discriminators employed will be equal to the number of units of the code, as also will be the number of trigger circuits in Fig. 10.

While the principles of the invention have been described above in connection with specific embodiments and particular modifications thereof, it is to be clearly understood that this description is made only by way of example and not as a limitation on the scope of the invention.

What is claimed is:

1. An electric pulse code modulator for producing code groups of pulses representing a signal wave according to the staggered step (cyclic permutation) binary code, comprising means for frequency modulating a carrier wave in accordance with the signal amplitude between specified frequency limits, phase changing means adapted to derive from the original modulated wave a plurality of derived waves each of which is in quadrature with the modulated wave at $2r$ frequencies within the said frequency limits (where $r$ is zero or a positive integer and has a different value for each derived wave) means for generating a pulse corresponding to each derived wave only when the said derived wave has a frequency which lies in alternate bands between adjacent pairs of the said $2r$ frequencies.

2. A modulator according to claim 1 in which the phase changing means comprises a delay line, the derived waves being obtained from tappings on the said line.

3. A modulator according to claim 2 in which the delay line comprises a plurality of sections of a band pass filter in which the limits of the pass band are the said specified frequency limits.

4. A modulator according to claim 1, comprising means for applying each desired wave together with the original modulated wave to a corresponding frequency discriminator adapted to produce a zero output voltage when the two applied waves are in quadrature and means for generating a gating potential only when the output voltage from the discriminator has one specified sign.

5. A modulator according to claim 4 in which each derived wave is obtained from a different tapping of the said delay line.

6. A modulator according to claim 4 in which two successive derived waves are obtained from the same tapping of the delay line, one of the said two derived waves and also the original wave being applied to the corresponding discriminator through respective frequency doublers.

7. A modulator according to claim 4, in which the means for generating the gating potential comprises a two-condition trigger device adapted to be switched from one condition to the other when the discriminator output voltage changes sign.

8. A modulator according to claim 4 comprising a plurality of normally blocked gating valves corresponding respectively to the said discriminators, means for applying the gating potential from each discriminator to unblock the corresponding gating valve, means for applying a train of pulses to each gating valve, and distributor means adapted to collect the pulses passed by the several gating valves and to assemble them in code groups representing the instantaneous signal amplitudes.

9. An electric pulse code demodulator for demodulating code groups of pulses representing signal amplitudes according to the staggered step (cyclic permutation) binary code comprising means for directing the pulses corresponding respectively to the code elements of each code group into separate channels, a plurality of two-condition trigger circuits corresponding respectively to the said code elements, each of which circuits is initially in the unoperated condition and each being adapted to produce when operated an output voltage proportional to $2m$ where $m$ has a different integral value or zero for each trigger circuit, means for applying the pulses (if present) in the respective code elements in turn to reverse the condition of some or all of the said trigger circuits, and means for combining the output voltages of the said circuits, the applying means being such that a pulse in any code element is applied to reverse the trigger circuit corresponding to the code element and also all the trigger circuits corresponding to the succeeding code elements.

10. A demodulator according to claim 9 comprising means for applying the combined output voltages of the trigger circuits to a normally blocked gate circuit, means for unblocking the gate circuit to produce a short pulse after the trigger circuits have been set by the corresponding code group of pulses, and means for recovering the modulating signal from the amplitude modulated pulses so produced by the gate circuit.

11. A demodulator according to claim 10 comprising means for restoring all the trigger circuits to the unoperated condition after the production of the said short pulse.

12. A demodulator according to claim 11 comprising a pulse generator adapted to produce a succession of gating pulses each followed by a restoring pulse, and means for applying the gating pulses to the gating circuit and the restoring pulses simultaneously to all the trigger circuits.

13. An electric pulse code modulator for translating amplitude modulated signals into a staggered step (cyclic permutation) binary code comprising means for translating the amplitude modulated signal into a frequency modulated wave, means for producing at successive points progressive phase shifts of said frequency modulated wave, a plurality of phase comparison means each responsive to the phase at a different one of said points for producing one of two voltage conditions, and means responsive to the voltage condition at the output of each of said comparison means for determining whether a pulse code is to be transmitted or not.

CHARLES WILLIAM EARP.
MALCOLM FRANK WINTLE.

REFERENCES CITED

The following references are of record in the file of this patent:

UNITED STATES PATENTS

| Number | Name | Date |
|---|---|---|
| 2,272,070 | Reeves | Feb. 3, 1942 |

OTHER REFERENCES

Article—"Pulse Code Modulation" by Black and Edson, pages 20–23 and 38—August 30, 1947, issue of Telephony.